April 16, 1968 H. HAAS 3,377,839
APPARATUS FOR THE DETERMINATION OF BULK DENSITIES
Filed Jan. 4, 1966
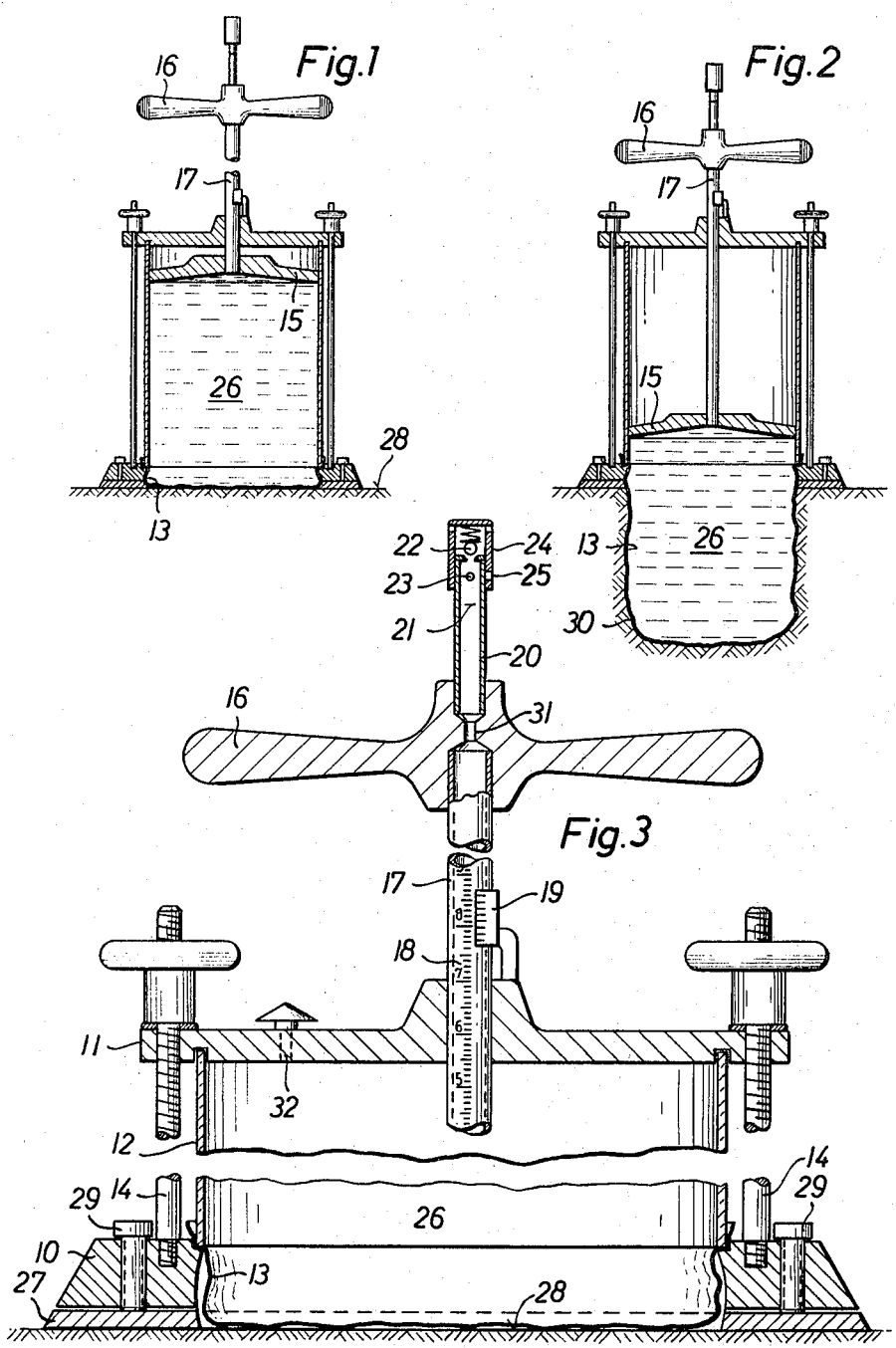
INVENTOR
HANS HAAS
BY
Burgess, Dinklage & Sprung
Attorneys

United States Patent Office 3,377,839
Patented Apr. 16, 1968

3,377,839
APPARATUS FOR THE DETERMINATION OF BULK DENSITIES
Hans Haas, Hoffnungsthal, Germany, assignor to Strabag Bau-A.G., Cologne-Deutz, Germany, a corporation of Germany
Filed Jan. 4, 1966, Ser. No. 518,727
8 Claims. (Cl. 73—32)

ABSTRACT OF THE DISCLOSURE

An excavation volume measuring device having a cylinder, piston, flexible bladder at the non-piston end of the cylinder, a fluid in the cylinder, means for measuring piston displacement, a standpipe communicating with the cylinder and means to determine a fluid level in the standpipe.

---

This invention relates to a method of determining bulk densities of various materials. It more particularly refers to a method of determining bulk densities of bulk solids in situ. It also refers to an apparatus particularly suited to carrying out the method of this invention.

There is a need to determine the bulk densities of bulk solids in situ in many applications. Probably the most important application in which this information is required is in road building and other earth construction fields. In order to determine the bulk density of a bulk solid it is necessary to know the weight of a given volume of solid. This invention is most specifically directed toward determining the volume of a given sample of bulk solid, particularly earth.

In general earth bulk densities are calculated by excavating a hole in the earth being tested without significant compaction or loosening of the earth surrounding the excavation the excavated earth is weighed and the volume of the excavation is measured. These two factors, of course, determine the bulk density.

It has in the past been common to measure the volume of an excavation by metering a fluid into it and measuring the volume of fluid required to fill the excavation. In the so-called water-substitute-process a highly elastic bladder member is, under water pressure pressed into the excavation to the extent necessary to fill out the excavation. The quantity of water required to cause the bladder to fill out the excavation was measured to determine the excavation volume. In order to expedite the measuring of the quantity of water required to fill the excavation it has become known to meter the water into the bladder to fill the excavation from a free liquid level measuring cylinder. Because of the precision required in measuring the quantity of water, it has been found practical to meter the water only from a rather small diameter measuring cylinder, particularly a cylinder which does not exceed about 60 millimeters in diameter. The requirement of the use of relatively small diameter measuring cylinders has permitted this process to be operative with rather small excavations thereby incurring the possibility of inaccuracy, not in the measuring technique, but in the representativeness of the sample of earth selected. In addition this measuring technique suffers from the disadvantage that due to the height of the free standing water in the excavation, greater pressure is brought to bear upon the bottom of the excavation causing compaction of the earth in an uneven manner whereby erroneous measurements can occur.

The free standing head of water technique of measuring excavation volume has been improved upon through the use of positive pressure measuring pistons operating within a cylinder closed at the non-piston end with a highly elastic bladder of the aforementioned type. A specific measured quantity of water or other measuring fluid is maintained between the piston and the bladder and the excavation filled by means of positive piston pressure on water, causing the bladder to substantially uniformly fill out the excavation. The volume of the excavation is a direct function of the distance the piston moves in causing the bladder to fill out the excavation. Measurement is therefore greatly simplified and at the same time the walls of the excavation are subjected to much more uniform pressure loading than was the case with the free standing head of water device and method described above.

Although this pressure method is markedly superior to the free standing head of water method, it too suffers from disadvantages which render it less than wholly satisfactory and a complete solution to the problems. Since the method is based upon filling the excavation fully with water within a bladder, a "feel" or fine sense of touch is required to be able to appreciate when the excavation is completely filled without enforcing more than minimal compaction upon the earth of the excavation walls. This requires that the piston be rather freely riding within the cylinder yet there must be a good seal between the cylinder and the piston in order to prevent leakage of the water thereby causing possibly erroneous readings.

In addition, both the free standing water head and the positive piston pressure devices and methods require that under no circumstances may the device become disengaged from the ground surrounding the excavation being measured since this would tend to destroy the accuracy of the measurements being made. Thus, it has been the practice to require two operators, one does the actual measuring while the second actually stands on the bottom edge of the apparatus.

It is therefore an object of this invention to provide an improved apparatus for accurately measuring the volume of an excavation.

It is another object of this invention to provide an improved apparatus for accurately measuring the volume of an excavation which is not subject to the defects of prior devices.

It is a further object of this invention to provide such an improved device which requires less manpower to operate than prior devices.

It is still another object of this invention to provide such an improved device which enables the operator to positively determine by visual when the excavation whose volume is being measured has been filled with the measuring fluid.

It is still a further object of this invention to provide a process for measuring the volume of earth excavations utilizing the apparatus of this invention.

Other and additional objects will appear from a full consideration of the entire specification including the drawing and the appended claims.

In accord with and fulfilling these objects, this invention has as one of its aspects an apparatus for measuring the volume of an excavation comprising: A cylinder closed at one end by means of a highly elastic bladder and closed at the other end by means of a movable piston, the space defined by the piston, the cylinder and the bladder containing a predetermined fixed quantity of water or another suitable relatively incompressible fluid. A stand-pipe is provided in the cylinder, either through the piston or otherwise so arranged and positioned that it operates solely from the hydrostatic head generated in the cylinder. Appropriately and preferably, this standpipe may be the piston rod itself. The standpipe contains a reference marking near the top thereof and is transparent at least at that point, and the piston rod carries depth marking, suitably positioned adjacent a vernier scale. The standpipe further has the end thereof not communicating with said cylinder (the free end) open and available to the atmosphere. Suitably a cap is provided whereby the free end may be closed to the atmosphere.

The method of utilizing this apparatus and its advantages over prior devices will be discussed with reference to the drawing wherein:

FIG. 1 is a front elevation partially in section showing a device according to this invention prior to use;

FIG. 2 is a front elevation partially in section showing a device according to this invention in use; and FIG. 3 is an enlarged front elevation partially in section and with parts broken away of the device of this invention.

Referring now to the drawing and particularly to FIGS. 1 and 2 thereof, the apparatus of this invention comprises a bottom plate 10 and a top plate 11 housing a cylinder 12 and clamped together by bolts 14. The cylinder ends are closed respectively by a highly elastic bladder 13 and a piston 15. A piston rod 17 having a handle 16 thereon is attached to the piston 15 and passes through the top plate 11. Contained within the space defined by the cylinder 12, bladder 13 and piston 15 is a measured quantity of water 26. Prior to operation, as shown in FIG. 1, the apparatus rests on the earth 28. As shown in FIG. 2, as the apparatus is used the water 26 causes the bladder 13 to fill the excavation 30.

The operation of this invention will be best understood with reference to FIG. 3 which is now referred to. The apparatus is set upon the earth 28 to be measured. The piston is depressed through the piston rod 17 and the handle 16 until the fluid in the standpipe (illustrated as being coextensive with and part of the piston rod 17) reaches the level of a mark 21 previously made on the standpipe. This is accomplished by causing the water 26 to extend the bladder 13 into contact with unexcavated earth 28 and constitutes a "zero" reading. A scale 18 on the piston rod 17 is read against a vernier 19 to determine the point from which measurement will be made.

The pressure on the piston is released and the apparatus is carefully removed from the point of measurement. The earth is excavated to a suitable depth within the area defined by the bottom plate 10 and the apparatus restored to its previous position. The piston is again depressed causing the water to extend the bladder 13 to fill out the excavation 30 until the water level in the standpipe again reaches the mark 21. The scale 18 is again read against the vernier 19 and the difference between the first and second readings of the scale represents the volume of water to fill the excavation.

While the entire apparatus may be moved between the first reading and the excavation, it is much more desirable to retain the bottom ring 27 in position and remove the remainder of the apparatus by loosening the bolts 29. In this manner the exact positioning of the apparatus is not changed.

As noted above, it is desirable to provide the free end of the standpipe with atmospheric access. This is accomplished by providing a hole 23, a cap 24 and a recoil, or other similar type, valve 22 at the free end of the standpipe. This is utilized as follows: The cap 24 and valve 22 effectively close the hole 23 during the "zero" reading referred to above; after replacement over excavation, the hole 23 is exposed to the atmosphere and the water 26 causes the bladder 13 to substantially fill the excavation; the hole 23 is then closed by means of the valve 22 and cap 24 and piston pressure exerted to cause the water to rise to the mark 21 as aforesaid, and thereby enable equalized pressure measurements to be taken. In forcing water into the standpipe to the level of the mark, air is forced onto the standpipe through the valve 22, but since this is a check-type valve, air cannot flow back in upon release of the piston pressure.

It has been found to be quite desirable to provide the upper or free end of the standpipe as relatively thin transparent tubing 20 and to provide a throttle-neck 31 below the mark 21 to prevent, or at least minimize water loss through the standpipe.

It has further been found to be quite desirable to provide a pressure equalization valve 32 in the top plate 11 so as to equalize the pressure on both sides of the piston.

It has been found that by releasing the piston during the taking of readings the liquid level in the standpipe will fall causing a vacuum in the upper end of the standpipe since the hole 23 is closed to the atmosphere. Surprisingly, it has been found that this vacuum at least compensates for and negates the prior practice of utilizing a second operator standing on the apparatus.

In accordance with this invention, the bladder may be made of rubber or substantially any other elastomer, such as the elastomeric silicone or polybutadiene rubbers, or poly-urethane elastomers.

While the invention has been described in detail with reference to certain specific embodiments, various changes and modifications which fall within the spirit of the invention and scope of the appended claims will become apparent to the skilled artisan. The invention is, therefore, only intended to be limited by the appended claims or their equivalents wherein I have endeavored to claim all inherent novelty.

What is claimed is:

1. In a device for measuring the volume of an excavation which device comprises a cylinder closed at each end respectively by a movable piston and an elastic bladder containing a substantially incompressible fluid in the space defined by the cylinder, bladder and piston, and piston displacement measuring means; the improvement which comprises a standpipe in said device communicating with said space whereby readings of piston deflection can be made under equalized internal fluid pressure and conditions; and means for measuring fluid level in said standpipe.

2. Improved device as claimed in claim 1 wherein said standpipe has a mark thereon near the non-cylinder end thereof whereby a fluid level is maintained at said mark by means of piston pressure during all readings taken on said device.

3. Improved device as claimed in claim 2 wherein the atmospheric end of said standpipe is transparent and of smaller diameter than the remainder thereof.

4. Improved device as claimed in claim 2 wherein said standpipe has a necked down portion between said mark and said cylinder.

5. Improved device as claimed in claim 2 wherein said standpipe is a piston rod operatively attached to said piston.

6. Improved device as claimed in claim 5 wherein said standpipe communicates to the atmosphere by means of a recoil valve operating hole therein.

7. Improved device as claimed in claim 6 wherein said hole is operatively openable and closable by means of a cap upon said standpipe containing a matching hole therein.

8. Improved device as claimed in claim 5 wherein said piston rod is calibrated to indicate the fluid level within said cylinder.

References Cited

UNITED STATES PATENTS

| 2,270,505 | 1/1942 | Burleson | 73—149 |
| 2,314,540 | 3/1943 | Huntington | 73—149 |
| 2,924,096 | 2/1960 | Humphres | 73—149 |

RICHARD C. QUEISSER, *Primary Examiner.*

D. SCHNEIDER, *Assistant Examiner.*